(12) United States Patent
Tokunaga

(10) Patent No.: US 8,736,785 B2
(45) Date of Patent: May 27, 2014

(54) LIQUID CRYSTAL DISPLAY DEVICE AND ELECTRONIC DEVICE

(75) Inventor: Shingo Tokunaga, Kokubunji (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 176 days.

(21) Appl. No.: 13/546,334

(22) Filed: Jul. 11, 2012

(65) Prior Publication Data
US 2013/0016303 A1  Jan. 17, 2013

(30) Foreign Application Priority Data

Jul. 12, 2011 (JP) ................................. 2011-153992

(51) Int. Cl.
*G02F 1/1333* (2006.01)
*H02B 1/015* (2006.01)

(52) U.S. Cl.
USPC .................. 349/58; 349/59; 349/60; 361/644

(58) Field of Classification Search
USPC ................................. 349/58, 59, 60; 361/644
See application file for complete search history.

(56) References Cited

U.S. PATENT DOCUMENTS

2006/0133018 A1* 6/2006 Okuda .......................... 361/681
2009/0059499 A1* 3/2009 Ono et al. ..................... 361/681

FOREIGN PATENT DOCUMENTS

| JP | 2009-086634 A | 4/2009 |
| JP | 2009-139958 A | 6/2009 |
| JP | 2010-085548 A | 4/2010 |

* cited by examiner

*Primary Examiner* — Mike Qi
(74) *Attorney, Agent, or Firm* — Maschoff Brennan

(57) ABSTRACT

A liquid crystal display device includes a liquid crystal panel including a first translucent substrate and a second translucent substrate between which a liquid crystal material is sealed; a flexible wiring board extending from a connection end portion with respect to the first translucent substrate; and a metal-reinforced resin container. The container includes a first principal surface onto which the liquid crystal panel is accommodated; a second principal surface onto which a printed wiring board is disposed; and a through hole for allowing an extended end portion of the flexible wiring board to pass therethrough from the first principal surface to the second principal surface so that the extended end portion is connected to the printed wiring board. The through hole is provided at a position corresponding to an overlapping portion between the first translucent substrate and the second translucent substrate.

16 Claims, 7 Drawing Sheets

1 LIQUID CRYSTAL DISPLAY DEVICE

1A LIQUID CRYSTAL DISPLAY DEVICE

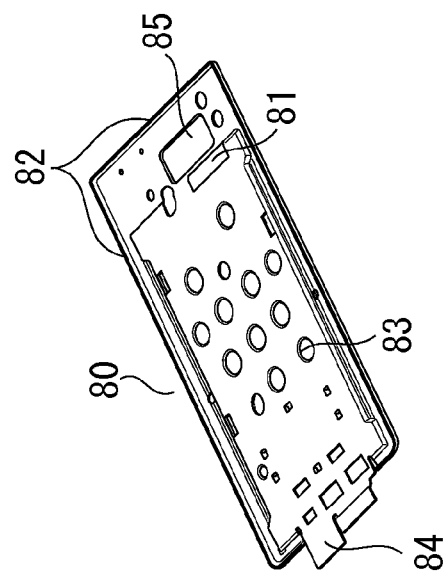
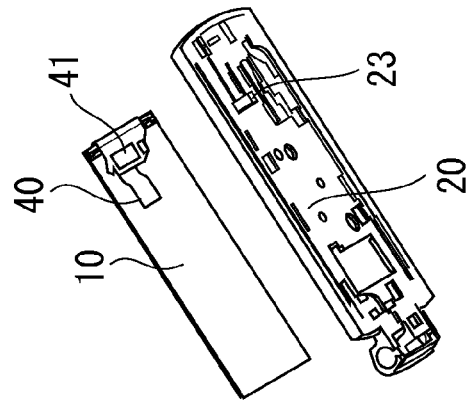
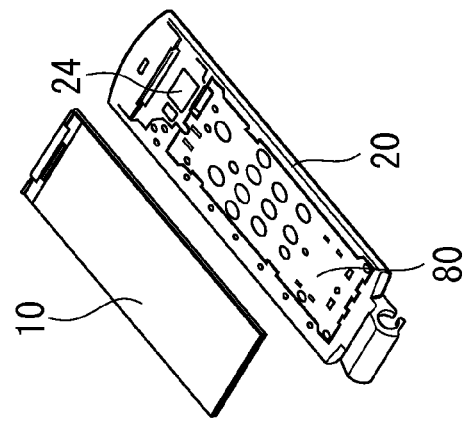

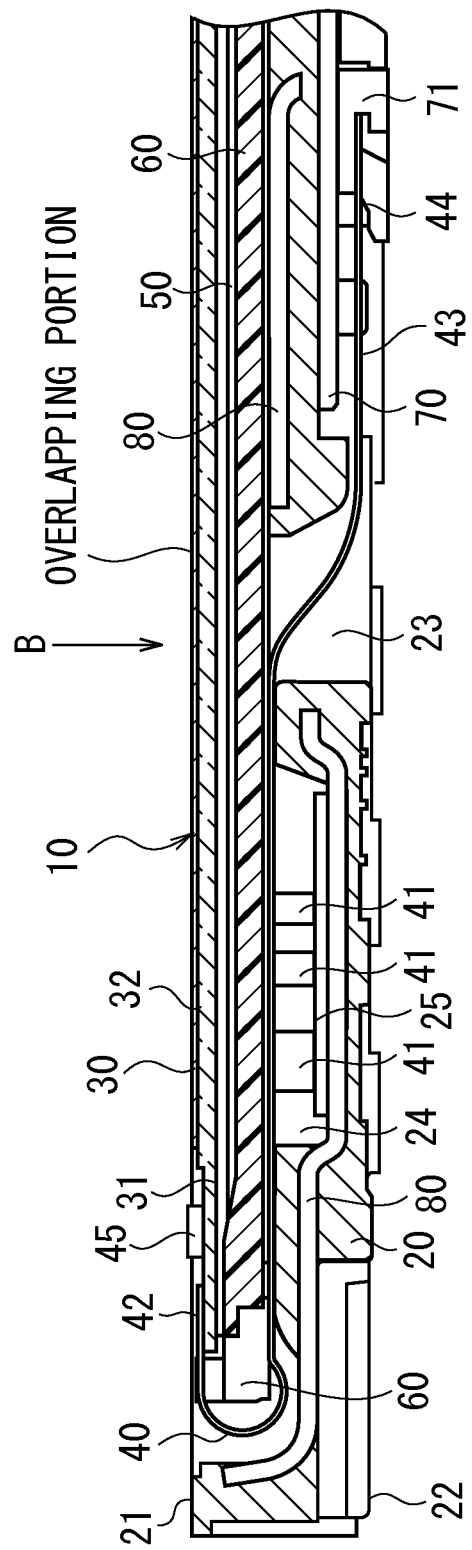

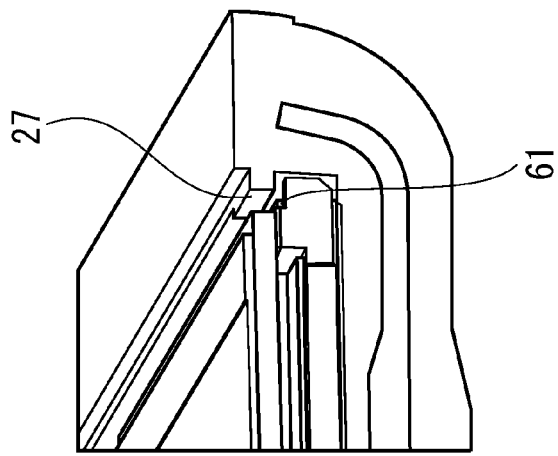
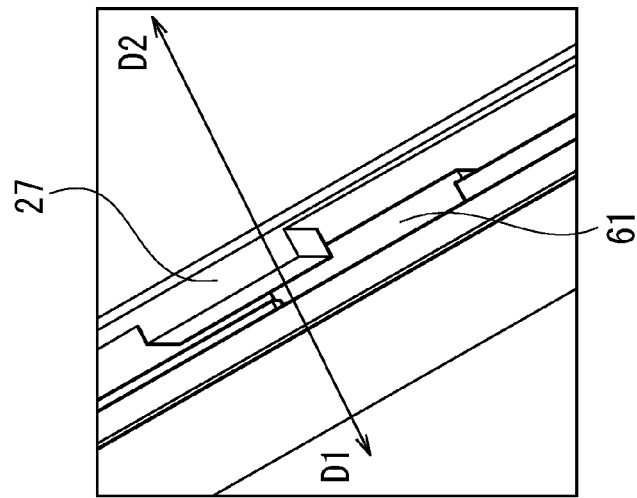
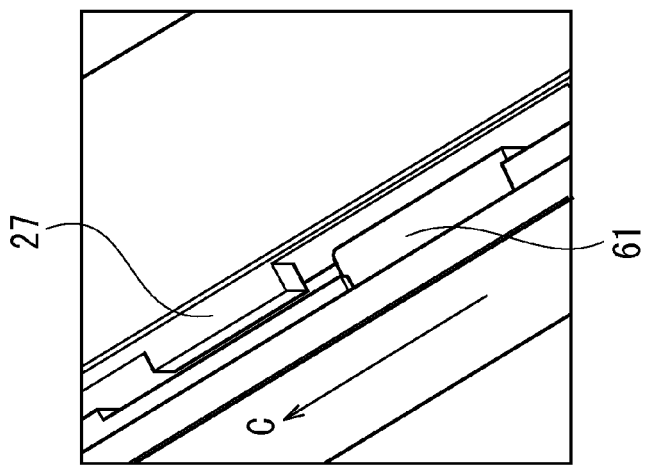

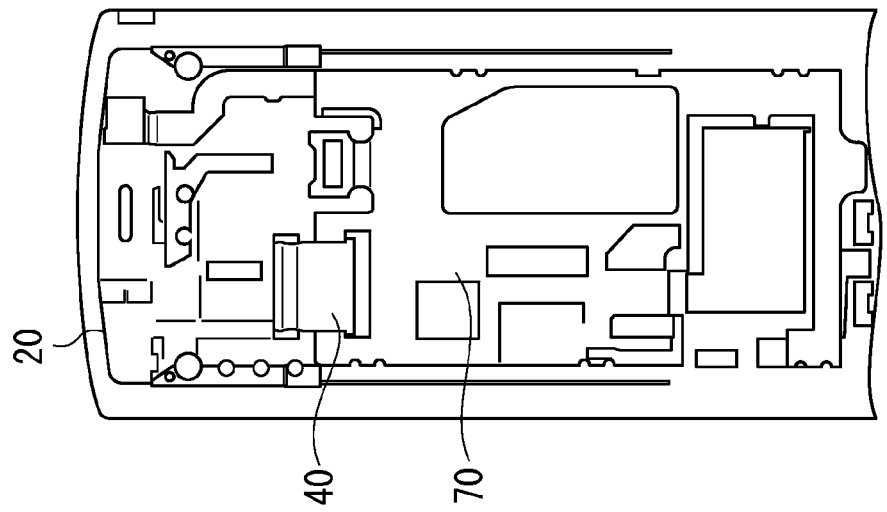
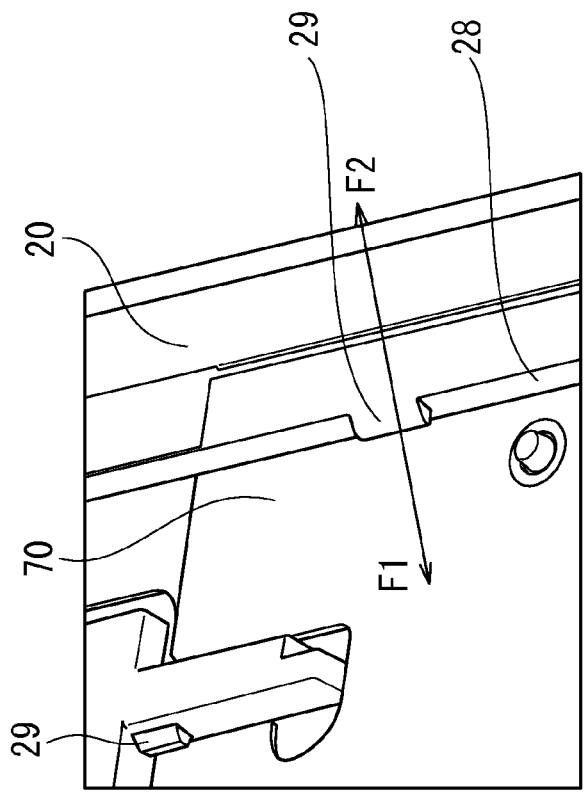
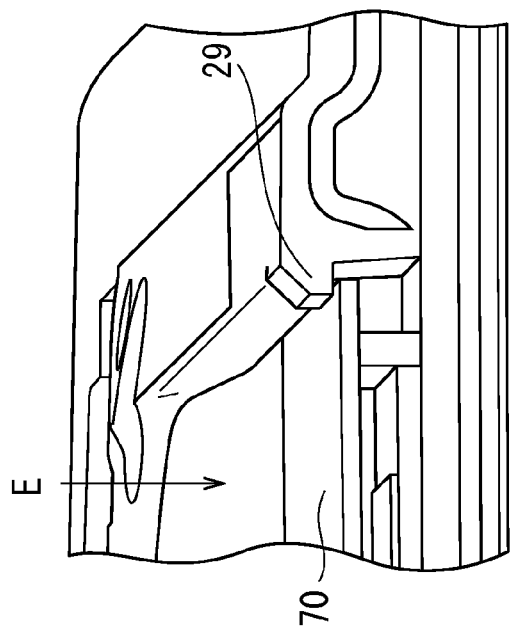

LIQUID CRYSTAL DISPLAY DEVICE AND ELECTRONIC DEVICE

CROSS-REFERENCE TO RELATED APPLICATION

The disclosure of Japanese Patent Application No. JP 2011-153992 filed on Jul. 12, 2011 including the specification, claims, drawings and abstract is incorporated herein by reference in its entirety.

FIELD

The disclosures made herein relate to a liquid crystal display device and an electronic device including the liquid crystal display device.

BACKGROUND

A liquid crystal display device (LCD) is applied to a display portion of portable electronic devices, such as a mobile phone, a personal digital assistant, a portable game machine, and a calculator.

The liquid crystal display device includes a liquid crystal module. The liquid crystal module includes a liquid crystal panel to which a flexible wiring board is connected, an illumination unit bonded to the liquid crystal panel, and a frame that retains the liquid crystal panel and the illumination unit.

The liquid crystal panel of the liquid crystal module includes a first glass substrate and a second glass substrate, between which a liquid crystal composition is sealed, and other such components. The liquid crystal panel has a small thickness.

The following are related arts to the invention.

[Patent document 1] Japanese Patent Laid-Open Publication No. JP 2009-86634

[Patent document 2] Japanese Patent Laid-Open Publication No. JP 2009-139958

[Patent document 3] Japanese Patent Laid-Open Publication No. JP 2010-85548

SUMMARY

For permanent stable operation, the liquid crystal display device is required to compensate for the mechanical strength of the liquid crystal panel.

According to an aspect of the disclosures made herein, a liquid crystal display device includes a liquid crystal panel including a first translucent substrate and a second translucent substrate between which a liquid crystal material is sealed, the first translucent substrate including a drive circuit thereon and being larger in dimensions than the second translucent substrate; a flexible wiring board onto which a component is mounted, the flexible wiring board extending from a connection end portion with respect to the first translucent substrate of the liquid crystal panel; and a metal-reinforced resin container. The metal-reinforced resin container includes a first principal surface onto which the liquid crystal panel is accommodated; a second principal surface onto which a printed wiring board is disposed; and a through hole for allowing an extended end portion of the flexible wiring board to pass therethrough from the first principal surface to the second principal surface so that the extended end portion is connected to the printed wiring board. The through hole is provided at a position corresponding to an overlapping portion between the first translucent substrate and the second translucent substrate.

The objects and advantages of the invention will be realized and attained by means of the elements and combinations particularly pointed out in the claims.

BRIEF DESCRIPTION OF THE DRAWINGS

FIGS. 3A, 3B and 3C are exploded perspective views illustrating a configuration of a liquid crystal display device according to an embodiment;

FIG. 4 is a cross-sectional view illustrating the configuration of the liquid crystal display device according to the embodiment;

FIGS. 6A, 6B and 6C illustrate the engagement relationship between the liquid crystal module and the metal-reinforced resin container; and FIGS. 7A, 7B and 7C illustrate an engagement relationship between the metal-reinforced resin container and a printed wiring board.

DESCRIPTION OF EMBODIMENTS

Figure 1:
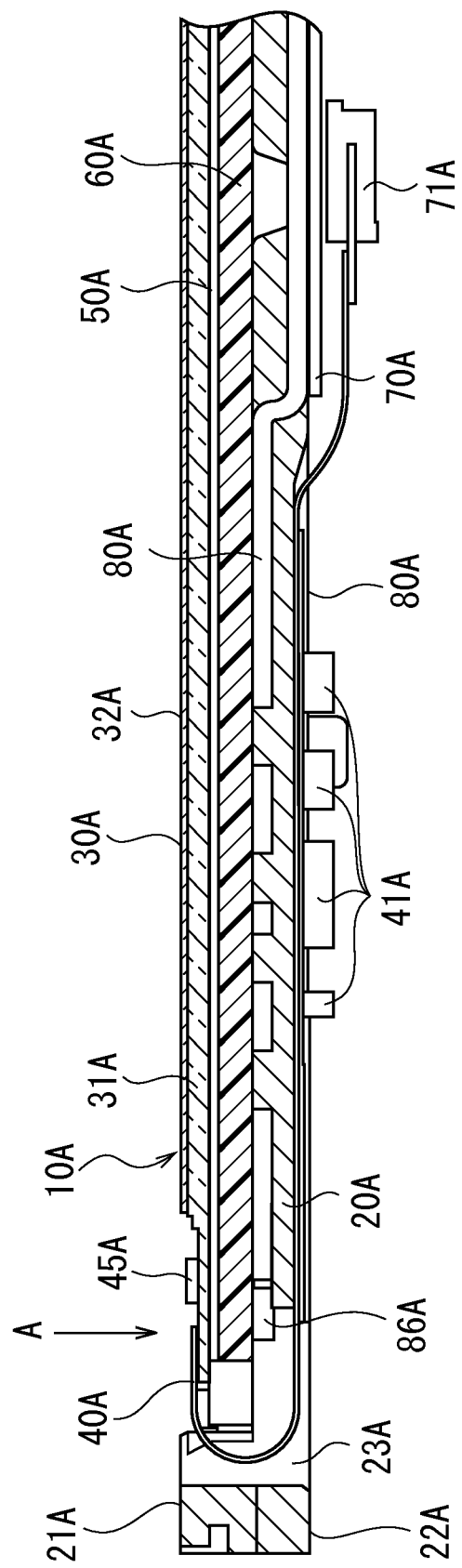
FIG. 1 is a cross-sectional view illustrating a configuration of a liquid crystal display device in the related art.

The embodiment of the disclosures made herein will be described below referring to the drawings in detail. The drawings illustrate a preferred embodiment. It should be understood, however, that the embodiment can be implemented by many different embodiments, and is not limited to the embodiment described herein.

Liquid Crystal Display Device in the Related Art

Figure 2A:
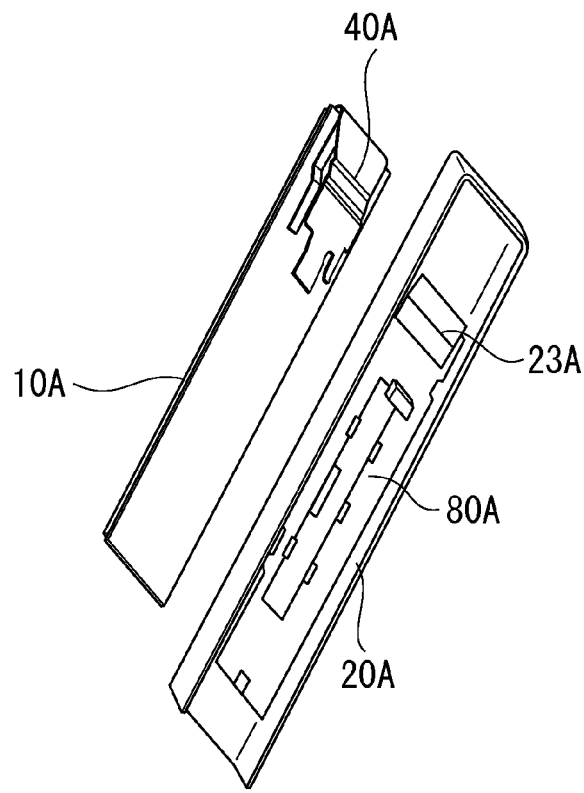
FIGS. 2A and 2B are exploded perspective views illustrating the configuration of the liquid crystal display device in the related art.

First, a configuration of a liquid crystal display device in the related art is described with reference to FIGS. 1, 2A, and 2B. In FIG. 1, for simple illustration, only main components such as a metal-reinforced resin container 20A are hatched to represent their cross sections.

In a liquid crystal display device 1A in the related art, a liquid crystal module 10A includes a liquid crystal panel 30A to which a flexible wiring board 40A is connected, an illumination unit 50A bonded to the liquid crystal panel 30A, and a resin frame 60A that retains the liquid crystal panel 30A and the illumination unit 50A.

The liquid crystal panel 30A of the liquid crystal module 10A includes a first glass substrate 31A and a second glass substrate 32A, between which a liquid crystal material (liquid crystal composition) is sealed, and other such components. The liquid crystal panel 30A has a small thickness, for example, about 2 mm.

The metal-reinforced resin container 20A is integrally molded with a metal plate 80A. The resin container 20A includes a first principal surface 21A on which the liquid crystal module 10A including the liquid crystal panel 30A is accommodated, a second principal surface 22A on which a printed wiring board 70A is disposed, and a through hole 23A for allowing the flexible wiring board 40A having a mounting component 41A mounted thereon to pass therethrough from the first principal surface 21A to the second principal surface 22A so that the flexible wiring board 40A may be connected to a connector 71A of the printed wiring board 70A.

Figure 2B:
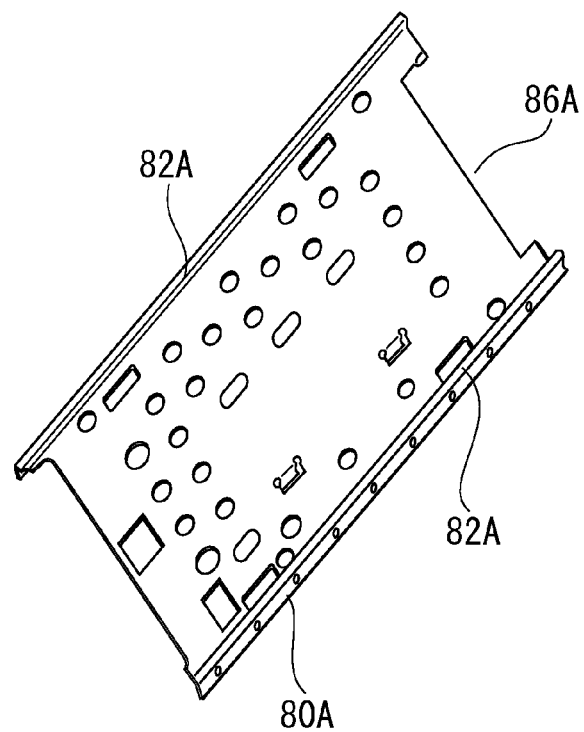

In order that the through hole 23A for allowing the flexible wiring board 40A to pass therethrough may be formed in the vicinity of one end portion of the resin container 20A, a notch portion 86A is provided at one end portion of the metal plate 80A and no erect wall 82A is present at the one end portion (see FIG. 2B).

As clearly understood by looking at an arrow position A of FIG. 1, the through hole 23A of the metal-reinforced resin container 20A is provided at a position at which only the first glass substrate 31A having a drive circuit component 45A mounted thereon is disposed.

The liquid crystal display device 1A has a problem in that the mechanical strength of the thin liquid crystal panel 30A, particularly the first glass substrate 31A, cannot be compensated for.

It is conceivable to provide the erect wall 82A also at the one end portion of the metal plate 80A integrally molded with the resin container 20A to compensate for the strength, and provide, instead of the notch portion 86A, a through hole for allowing the flexible wiring board 40A to pass therethrough in the vicinity of the one end portion. In this case, however, it is necessary to allow the mounting component 41A of the flexible wiring board 40A to pass through the through hole. Thus, there is another problem in that the through hole of the metal plate 80A cannot be restricted to be small in size.

Liquid Crystal Display Device of an Embodiment (Configuration)

Next, a configuration of a liquid crystal display device according to an embodiment of the present invention is described with reference to FIGS. 3A to 3C and 4. In FIG. 4, for simple illustration, only main components such as a metal-reinforced resin container 20 are hatched to represent their cross sections.

A flat, compact, thin liquid crystal display device (LCD) 1 includes a liquid crystal module 10 and the metal-reinforced resin container 20. The liquid crystal module 10 includes a liquid crystal panel 30, a flexible wiring board 40, an illumination unit 50, and a resin frame 60, which are formed integrally in advance.

The liquid crystal panel 30 of the liquid crystal module 10 includes a first translucent substrate 31 and a second translucent substrate 32 between which a liquid crystal material (liquid crystal composition) is sealed. The first translucent substrate 31 is larger in dimensions than the second translucent substrate 32. A drive circuit component 45 that drives the liquid crystal panel 30 is mounted in a region of the first translucent substrate 31 outside the second translucent substrate 32. Herein, the first translucent substrate 31 and the second translucent substrate 32 are glass substrates. Alternatively, however, plastic substrates may be used.

In a strict sense, the liquid crystal panel 30 includes a pair of polarizing plates and a pair of alignment layers in addition to the first translucent substrate 31 and the second translucent substrate 32. Those other components are easily understood and embodied by a person skilled in the art, and hence illustration of the configuration thereof is omitted.

In the flexible wiring board 40 of the liquid crystal module 10, a mounting component 41 and the like are mounted by chip-on-glass (COG) technology. The flexible wiring board 40 extends from a connection end portion 42 with respect to the first translucent substrate 31 which is larger in dimensions than the second translucent substrate 32 of the liquid crystal panel 30. On an extended end portion 43 of the flexible wiring board 40, there is provided a male connector (strictly, a contact) 44 to be connected to a female connector 71 mounted on a printed wiring board 70.

The resin frame 60 of the liquid crystal module 10 is a frame body that retains the liquid crystal panel 30 together with the illumination unit 50 which is provided on the rear surface side of the liquid crystal panel 30, that is, on the rear surface side of the first translucent substrate 31.

The illumination unit 50 is a backlight unit, which is easily understood and embodied by a person skilled in the art. Although the detailed configuration is not illustrated, the illumination unit 50 includes an optical sheet layer in which a plurality of optical sheets such as a diffusion sheet and a prism sheet are laminated, and a light guide plate that guides light emitted from a light source to the first translucent substrate 31 of the liquid crystal panel 30.

The metal-reinforced resin container 20 includes a first principal surface 21 on which the liquid crystal module 10 including the liquid crystal panel 30 is accommodated, a second principal surface 22 on which the printed wiring board 70 is disposed, and a rectangular through hole 23 for allowing the extended end portion 43 of the flexible wiring board 40 to pass therethrough from the first principal surface 21 to the second principal surface 22 so that the extended end portion 43 may be connected to the printed wiring board 70. As clearly understood by looking at an arrow position B of FIG. 4, it is important to provide the through hole 23 of the metal-reinforced resin container 20 at a position corresponding to an overlapping portion between the first translucent substrate 31 and the second translucent substrate 32.

In the metal-reinforced resin container 20 having the through hole 23, a metal plate 80 having a rectangular through hole 81 formed at the same position of the through hole 23 is formed by integral molding (insert molding). The metal plate 80 has an erect wall 82 as a continuous erect wall or a part-coupling (four-corner coupling) erect wall which is formed at four edge portions by press working, and also has a plurality of through holes 83 into which a resin is filled in the integral molding. FIG. 3C illustrates the state in which the metal plate 80 has the part-coupling erect wall 82 rather than a continuous erect wall. A protruding portion 84 having no erect wall is provided to achieve an effect of improving the electrical characteristics when the metal plate 80 is incorporated into an electronic device, and hence the protruding portion 84 does not affect the strength compensation of the resin container 20.

It is preferred that the through hole 23 of the metal-reinforced resin container 20 and the through hole 81 of the metal plate 80 be provided to have minimum dimensions necessary for allowing the extended end portion 43 of the flexible wiring board 40 to pass therethrough from the first principal surface 21 to the second principal surface 22 of the resin container 20.

The metal-reinforced resin container 20 further includes a concave portion 24 in the first principal surface 21, in which the mounting component 41 mounted on the flexible wiring board 40 is disposed. In the concave portion 24, the mounting component 41 can be provided while being attached with an insulating spacer 25 for eliminating an arrangement gap between the mounting component 41 and the resin container 20. The insulating spacer 25 prevents the occurrence of stress concentration to the liquid crystal panel 30.

The metal plate 80 integrally molded with the resin container 20 includes a concave portion 85 at a position corresponding to the concave portion 24. Accordingly, the metal plate 80 is partially exposed on the first principal surface 21 of the resin container 20. The concave portion 85 of the metal plate 80 is provided between the through hole 81 and the erect wall 82, and hence the formation position of the concave portion 24 of the resin container 20 maintains this relationship.

(Engagement Relationship Between Liquid Crystal Module 10 and Metal-Reinforced Resin Container 20)

Subsequently, an engagement relationship between the liquid crystal module 10 and the metal-reinforced resin container 20 in the liquid crystal display device 1 according to the embodiment of the present invention is described with reference to FIGS. 4 and 5A to 5D.

The liquid crystal module 10 of the liquid crystal display device 1 includes the liquid crystal panel 30 to which the flexible wiring board 40 is connected, the illumination unit 50 bonded to the rear surface of the liquid crystal panel 30, and the resin frame 60 that retains the liquid crystal panel 30 and the illumination unit 50, which are formed integrally in advance. The metal-reinforced resin container 20 is integrally molded with the partially-exposed metal plate 80.

Figure 5A:
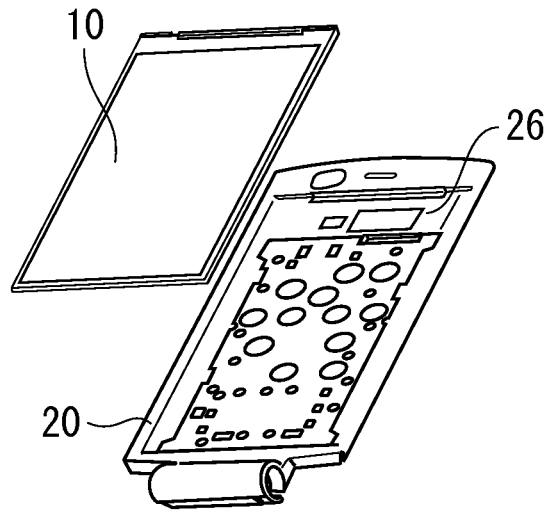
FIGS. 5A, 5B, 5C and 5D illustrate an engagement relationship between a liquid crystal module and a metal-reinforced resin container.
Figure 5B:
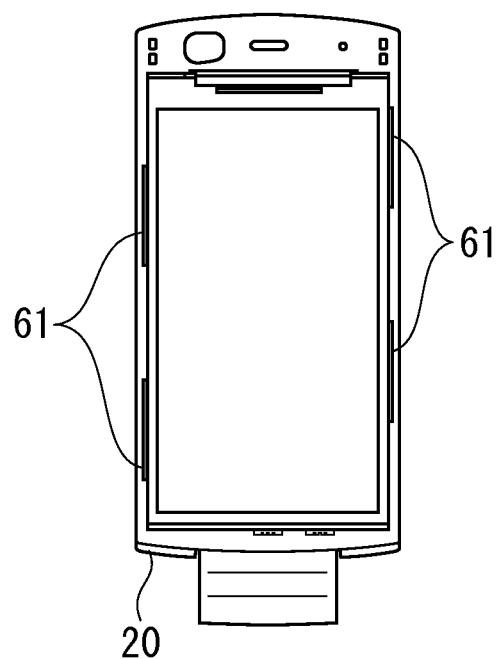
Figure 5C:
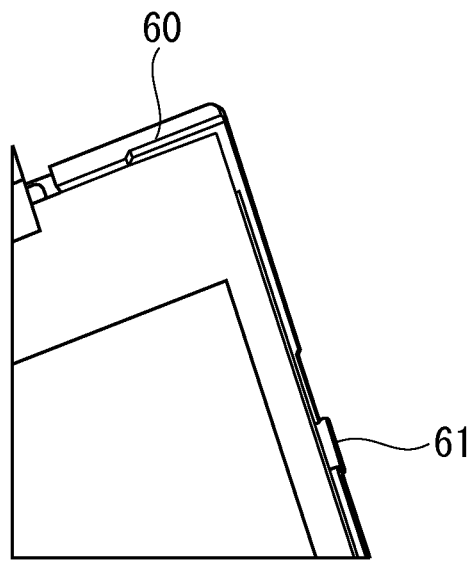
Figure 5D:
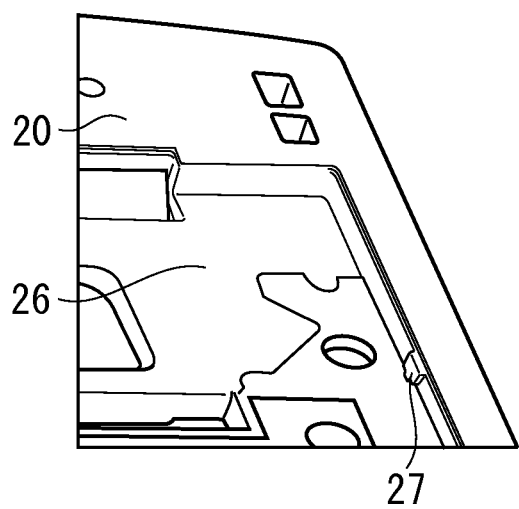

An assembly operator disposes the liquid crystal module 10 at a recess portion 26 formed in the first principal surface 21 of the resin container 20 (see FIG. 5A). At this time, the assembly operator operates so that the extended end portion 43 of the flexible wiring board 40 connected to the liquid crystal module 10 may pass through the rectangular through hole 23 of the resin container 20 from the first principal surface 21 to the second principal surface 22 (see FIG. 4). At the same time, the assembly operator operates so that the mounting component 41 mounted on the flexible wiring board 40 may be disposed in the concave portion 24 formed in the first principal surface 21 of the resin container 20 (see FIG. 4).

Four protruding portions 61 are provided at side end portions of the resin frame 60 of the liquid crystal module 10. On the side walls of the recess portion 26 of the resin container 20, protrusion receiving portions 27 to be fitted with the protruding portions 61, respectively, are provided (see FIGS. 5B, 5C, and 5D).

After the liquid crystal module 10 is disposed in the recess portion 26 of the resin container 20 so that the protruding portions 61 and the protrusion receiving portions 27 may not overlap each other, the assembly operator slides the liquid crystal module 10 in the direction of an arrow C so that the protruding portions 61 are positioned under the protrusion receiving portions 27 to be fitted therewith (see FIGS. 6A, 6B, and 6C). FIG. 6C is a cross-sectional view taken along the line D1-D2 of FIG. 6B.

(Engagement Relationship Between Metal-Reinforced Resin Container 20 and Printed Wiring Board 70)

Subsequently, an engagement relationship between the metal-reinforced resin container 20 and the printed wiring board 70 in the liquid crystal display device 1 according to the embodiment of the present invention is described with reference to FIGS. 4 and 7A to 7C.

In the metal-reinforced resin container 20 of the liquid crystal display device 1, the printed wiring board 70 is disposed in a recess portion 28 formed in the second principal surface 22 which is the rear surface of the first principal surface 21 on which the liquid crystal module 10 is accommodated (see FIG. 7A).

On the side wall of the recess portion 28, there are provided a plurality of board fixation claws 29 to be each engaged with a predetermined end portion of the printed wiring board 70 (see FIG. 7B). The board fixation claws 29 are trapezoidal in cross section. Accordingly, the printed wiring board 70 can be fixed in the recess portion 28 by being pushed toward the direction of an arrow E along inclined surfaces of the board fixation claws 29 (see FIG. 7C). FIG. 7C is a cross-sectional view taken along the line F1-F2 of FIG. 7B.

The contact 44 provided at the extended end portion 43 of the flexible wiring board 40 is connected to the female connector 71 which is mounted on the printed wiring board 70 fixedly-provided in the recess portion 28 (see FIGS. 4 and 7A).

According to the disclosed liquid crystal display device 1, the breakage of the liquid crystal panel 30 can be prevented.

Modified Example

The liquid crystal display device 1 according to the embodiment has been exemplified as being applied to a display portion of a mobile phone, but may be applied to a display portion of other portable electronic devices such as a personal digital assistant, a portable game machine, and a calculator.

What is claimed is:

1. A liquid crystal display device, comprising:
  a liquid crystal panel including a first translucent substrate and a second translucent substrate between which a liquid crystal material is sealed, the first translucent substrate including a drive circuit thereon and being larger in dimensions than the second translucent substrate;
  a flexible wiring board onto which a component is mounted, the flexible wiring board extending from a connection end portion with respect to the first translucent substrate of the liquid crystal panel; and
  a metal-reinforced resin container including:
    a first principal surface onto which the liquid crystal panel is accommodated;
    a second principal surface onto which a printed wiring board is disposed; and
    a through hole for allowing an extended end portion of the flexible wiring board to pass therethrough from the first principal surface to the second principal surface so that the extended end portion is connected to the printed wiring board, the through hole being provided at a position corresponding to an overlapping portion between the first translucent substrate and the second translucent substrate.

2. The liquid crystal display device according to claim 1, wherein the metal-reinforced resin container including the through hole includes a metal plate including a through hole at the same position as a position of the through hole included in the metal-reinforced resin container, the metal plate being integrally molded with the metal-reinforced resin container.

3. The liquid crystal display device according to claim 2, wherein the metal plate includes one of a continuous erect wall and a part-coupling erect wall at four edge portions.

4. The liquid crystal display device according to claim 1, wherein the through hole of the metal-reinforced resin container is provided to have minimum dimensions necessary for allowing the extended end portion of the flexible wiring board to pass therethrough from the first principal surface to the second principal surface.

5. The liquid crystal display device according to claim 1, wherein the metal-reinforced resin container further includes a concave portion in the first principal surface, in which the component mounted on the flexible wiring board is disposed.

6. The liquid crystal display device according to claim 5, wherein the metal-reinforced resin container further includes a member in the concave portion, which eliminates an arrangement gap of the component.

7. The liquid crystal display device according to claim 1, wherein, when a metal plate including a through hole at the same position as a position of the through hole included in the metal-reinforced resin container is integrally molded with the metal-reinforced resin container, the metal-reinforced resin container forms, in cooperation with the metal plate, a concave portion in the first principal surface, in which the component mounted on the flexible wiring board is disposed.

8. The liquid crystal display device according to claim 7, wherein the metal-reinforced resin container further includes a member in the concave portion, which eliminates an arrangement gap of the component.

9. An electronic device, comprising:
a liquid crystal display device, including:
- a liquid crystal panel including a first translucent substrate and a second translucent substrate between which a liquid crystal material is sealed, the first translucent substrate including a drive circuit thereon and being larger in dimensions than the second translucent substrate;
- a flexible wiring board onto which a component is mounted, the flexible wiring board extending from a connection end portion with respect to the first translucent substrate of the liquid crystal panel; and
a metal-reinforced resin container including:
- a first principal surface onto which the liquid crystal panel is accommodated;
- a second principal surface onto which a printed wiring board is disposed; and
- a through hole for allowing an extended end portion of the flexible wiring board to pass therethrough from the first principal surface to the second principal surface so that the extended end portion is connected to the printed wiring board, the through hole being provided at a position corresponding to an overlapping portion between the first translucent substrate and the second translucent substrate.

10. The electronic device according to claim 9, wherein the metal-reinforced resin container including the through hole includes a metal plate including a through hole at the same position as a position of the through hole included in the metal-reinforced resin container, the metal plate being integrally molded with the metal-reinforced resin container.

11. The electronic device according to claim 10, wherein the metal plate includes one of a continuous erect wall and a part-coupling erect wall at four edge portions.

12. The electronic device according to claim 9, wherein the through hole of the metal-reinforced resin container is provided to have minimum dimensions necessary for allowing the extended end portion of the flexible wiring board to pass therethrough from the first principal surface to the second principal surface.

13. The electronic device according to claim 9, wherein the metal-reinforced resin container further includes a concave portion in the first principal surface, in which the component mounted on the flexible wiring board is disposed.

14. The electronic device according to claim 13, wherein the metal-reinforced resin container further includes a member in the concave portion, which eliminates an arrangement gap of the component.

15. The electronic device according to claim 9, wherein, when a metal plate including a through hole at the same position as a position of the through hole included in the metal-reinforced resin container is integrally molded with the metal-reinforced resin container, the metal-reinforced resin container forms, in cooperation with the metal plate, a concave portion in the first principal surface, in which the component mounted on the flexible wiring board is disposed.

16. The electronic device according to claim 15, wherein the metal-reinforced resin container further includes a member in the concave portion, which eliminates an arrangement gap of the component.

* * * * *